J. W. AYLSWORTH.
FUSIBLE PHENOL RESIN AND METHOD OF FORMING SAME.
APPLICATION FILED JAN. 25, 1912.
1,029,737.
Patented June 18, 1912.
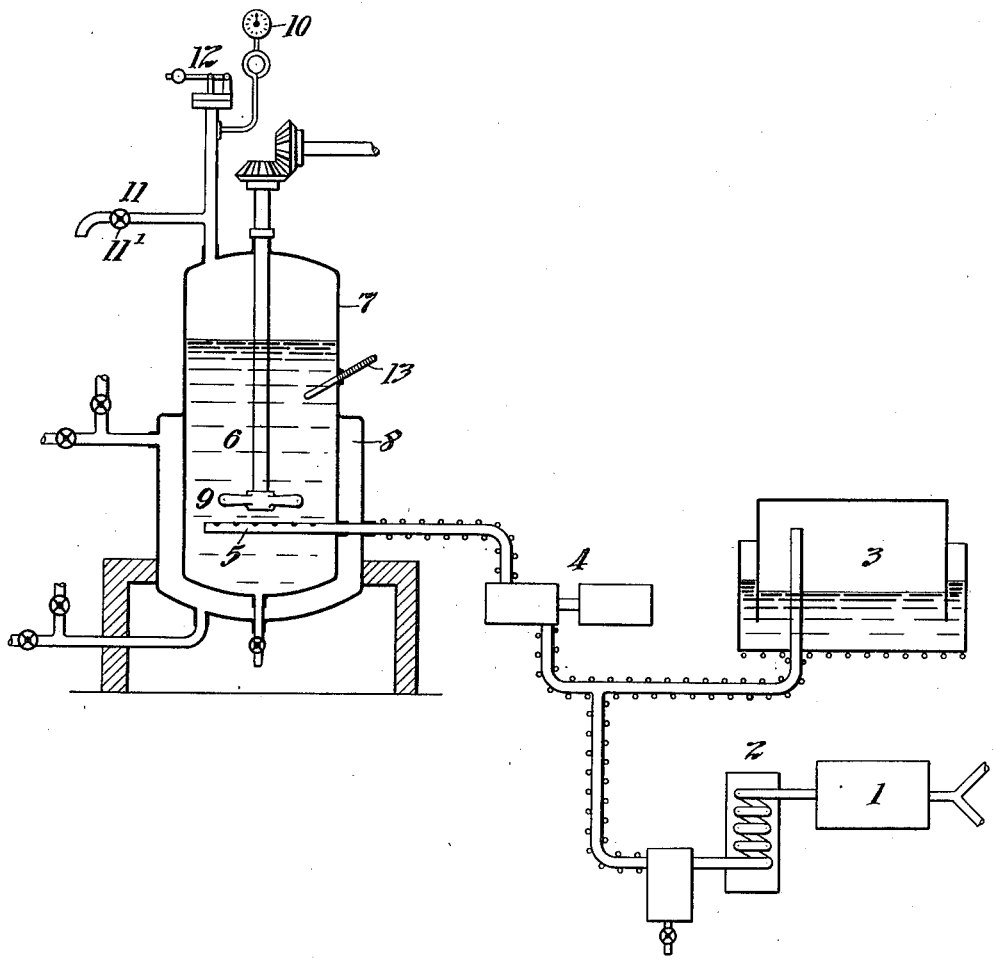

UNITED STATES PATENT OFFICE.

JONAS W. AYLSWORTH, OF EAST ORANGE, NEW JERSEY.

FUSIBLE PHENOL RESIN AND METHOD OF FORMING SAME.

1,029,737. Specification of Letters Patent. Patented June 18, 1912.

Original application filed May 14, 1909, Serial No. 496,060. Divided and this application filed January 25, 1912. Serial No. 673,362.

*To all whom it may concern:*

Be it known that I, JONAS W. AYLSWORTH, a citizen of the United States, and a resident of East Orange, in the county of Essex, State of New Jersey, have invented certain new and useful Improvements in Fusible Phenol Resins and Methods of Forming Same, of which the following is a description.

My invention relates to the production of synthetic resins which may be used for varnish gums, for baking enamels and japans, and as solid solvents for pyroxylyn and cellulose acetate and the like and also as an ingredient in the manufacture of infusible insoluble phenolic condensation products. The synthetic resins referred to are formed from phenol or cresol by condensation with formaldehyde.

The objects of this invention are to produce such resins having certain novel and useful characteristics and to devise novel and efficient methods for their manufacture, as will be hereinafter more fully described.

This application is a division of my application Ser. No. 496,060, filed May 14, 1909, entitled plastic composition and process of manufacturing the same.

The application above referred to describes the formation of a hard fusible resin by the condensation of phenol or cresol with formaldehyde and also the formation of an ultimate infusible phenolic condensation product, which is insoluble and very hard. This infusible product may be formed as described in the said application by reaction between the fusible phenol resin and an added amount of formaldehyde or its polymers. In the said application several methods are described for forming the fusible condensation product or phenolic resin. The second of these methods to be described hereinafter, is not claimed specifically herein, since it forms the subject matter of my application Ser. No. 613,577, process of forming fusible phenol resins, filed March 10, 1911, which also is a division of my application Ser. No. 496,060, referred to.

In order that my invention may be more clearly understood, attention is hereby directed to the accompanying drawing forming part of this specification and illustrating diagrammatically one form of apparatus wherein may be carried out in one of its forms, my improved method for forming the phenol resin referred to.

With the first method of forming the fusible phenol resin, phenol or cresol is heated in an autoclave to a temperature of from 260° to 340° F., and maintained at such temperature. I prefer to use a temperature between 280° and 300° F. but a higher temperature is necessary under some circumstances. The temperature to which the phenol is heated is determined by the nature of the phenol used and the time in which it is desired to form the resin, which is correspondingly shorter as a higher temperature is used. The melting point of the product formed is found by experience to vary with the use of different temperatures. Formaldehyde gas, which may be formed in suitable generators, is forced by suitable pumps into the bottom of the autoclave where it is distributed by means of a finely perforated coil into a multitude of bubbles, which pass upward through the phenol and are absorbed therein. A pressure in slight excess of the vapor tension of the contents of the autoclave is maintained in the autoclave by means of feeding compressed formaldehyde gas therein as rapidly as it combines with the phenol. At a pressure of 50 to 100 pounds per square inch, good results may be obtained. The reaction may be carried on more rapidly at higher temperatures than those which I have above described as preferable and convenient. The pressure used is about the same as that of water vapor at the temperature used.

The contents of the vessel are preferably kept in rapid circulation by a propeller or other convenient means. The reaction proceeds rapidly and provision should be made for carrying off the excess heat above the proper reaction temperature, which is the temperature to which the phenol was initially heated. Such a heat in excess of that necessary to maintain the reaction temperature will be generated by the reaction itself. The supply of formaldehyde is continued until a sample withdrawn for test, made by any suitable manner, shows only a very small percentage of free or unchanged phenol. The supply of gas is then stopped and a vent in the autoclave is opened for the escape of steam, which is regulated by a suitable valve. The contents of the chamber are then heated to complete dehydration, which requires about 400° F. of heat. The contents are then cooled to about 240° F. and cast in ingots for subsequent use, or passed into suitable mixing vessels for immediate use.

Referring to the drawing illustrating a means for practicing the first method of forming phenol resin described, formaldehyde is generated in the generator 1, and passes through condenser 2, which removes unchanged methyl-alcohol therefrom, to the gasometer 3, which is provided with an oil seal and is adapted to be steam heated. Formaldehyde gas is taken therefrom as desired, by pump 4 and allowed to pass as bubbles from perforated pipe 5 into the liquid phenol 6 in the autoclave 7 which is provided with steam jacket 8, agitator 9, pressure gage 10, vent 11 for the escape of steam when necessary, which is regulated by a valve 11', and safety valve 12. Provision should be made for steam heating the pipes through which the formaldehyde passes, and for passing cooling water through steam jacket 8 when the reaction has started to prevent the temperature from rising above the proper reaction temperature. This can be regulated by thermometer 13.

In the second of the methods above referred to by which the phenol resin may be formed, phenol and a 40 per cent. solution of formaldehyde, together with a small percentage of either an acid or a basic acceleration or catalytic agent, are treated and allowed to interact to form rapidly the ultimate condensation product of the phenol and the formaldehyde in the form of an infusible porous mass. This mass will be porous because of the evolution of gaseous products, which as is well-known, takes place when the reaction between the phenol and formaldehyde is allowed to rapidly ensue at an elevated temperature and under no counteracting pressure. In this case, however, this is of no moment, because of the subsequent treatment of the mass. This infusible mass is preferably crushed and pulverized and then baked at approximately 350° F., whereby entrapped water and acid vapors are expelled. The powdered and dried substance is mixed with phenol or cresol in approximately the proportion of two parts of the final condensation product to one part of the phenol, and heated in a closed vessel under its own pressure to a temperature of from 450° to 550° F., for several hours. By this treatment the ingredients of the mass go into the solution with a chemical change, whereby the product reverts or is broken down to the fusible resin presumably by reduction of the formaldehyde element in the combination. By this means after the distillation of the excess unchanged phenol a resin is formed similar to that described in the process first described.

In method 2, just described, the ultimate condensation product is entirely converted into phenol resin, there being an excess of phenol, as stated, after the formation of the resin, which may be distilled off. Instead of distilling off this excess phenol, however, compressed formaldehyde gas may be forced into the solution, after the ultimate product has been broken down to phenol resin, and caused to combine with the excess phenol, as in the first process, to form more phenol resin, the gas being forced into the solution as fast as it combines with the excess phenol, and this continued, as in the first described process, until a test sample shows the desired small percentage of uncombined phenol. As noted above, under the second method, acid or basic condensing agents apparently must be used in small percentages in the formation of the ultimate infusible product which is to be broken down to the fusible condensation product or phenol resin, since infusible phenolic condensation products formed without such agents do not readily dissolve in the phenol except at much higher temperature.

It is especially advantageous to combine methods 1 and 2, as just described, because thereby a manufacturer is enabled to use scrap material and discarded and imperfect articles. Phenol and cresol are the preferred solvents for the ultimate condensation product, but other solvents may be used, such as a mixture of phenol and naphthalene, the naphthalene in this case being removed by distillation after the solution is formed, if desired. In this method the naphthalene is used to dilute the solvent mixture, and to obviate the necessity of using as much free phenol as would otherwise be necessary. In the last described process, when a mixture of phenol and naphthalene is used as the solvent for the ultimate condensation product to be transformed or broken down into the phenol resin, the phenol must be added in the proportion of about 20% of the condensation product and the naphthalene in about the proportion of from 50% to 100% of the condensation product.

In addition to methods 1 and 2 and the combination thereof previously described for forming phenol resin, I may use a 35% solution of formaldehyde in the proportion of 1000 parts of phenol to 750 parts of formaldehyde by weight, and heat the mass to a temperature of from 300 degrees to 320 degrees F. under its own pressure, without any agent. If a 40% solution of formaldehyde is used, the proportions should be about 650 parts of formaldehyde to 1000 parts of phenol. In the above proportions, formaldehyde solutions are given as volume percentages. The weight percentage of the formaldehyde in the solution is approximately 5% less. The proportions of formaldehyde solution given in the formulas are slightly more than the required amount to allow for losses during the process. In this method as in method No. 1 above described, care must be taken to avoid the presence of any impurity which will act as an accelerator or catalytic agent, otherwise difficultly fusible and very viscid products will result. For instance, if the operation is carried out in an iron vessel, care must be taken to have the iron well enameled or lined with a metal which will not modify the product. Iron and lead so modify the product as to render the latter unfit. Tin or tinned copper or nickel, are metals which can be used to line the vessel without modifying the product. If crude phenol or cresol are used, they should first be refined by distillation to eliminate basic metallic impurities as well as mineral acids.

The phenol resin obtained by any of the methods described after complete dehydration and removal of excess phenol is a hard resin, very similar in texture to copal and kauri gum. It is soluble in all proportions in acetone, amyl, ethyl, methyl and butyl alcohol, amyl, ethyl and methyl acetate, acetic acid, acetylene tetra-chlorid, and mono-nitro-benzene, (oil of mibane) from which it remains unchanged after evaporation of the solvents. It is fusible and practically unchanged when heated to 420 degrees F. It melts at about 220 degrees F., but has no sharp melting point, passing through various degrees of viscosity, until at 250 degrees F. it may readily be poured and at 350 degrees F. it becomes quite thinly fluid. It acts as a weak acid toward bases with which it combines. It is soluble in shellac, resin and similar substances when fused therewith. This resin will not form the hard infusible condensation product described by Smith, Story, Baekeland and others, (see English Patents 16,247 of 1899, to Smith, 8,875 of 1905, to Story, U. S. Patents 942,699 to Baekeland, and 735,278, to Luft, and an article by W. Kleeberg, in the German publication *Annalen der Chemie*, Liebig, vol. 263, page 283, 1891), when heated with basic or condensing agents, or alone, at any temperature. When mixed with formaldehyde, paraformaldehyde, or trioxymethylene, and heated, it combines therewith and forms a hard infusible mass, which, if not admixed with other bodies, remains transparent and chemically inert, and is insoluble in water and in the following solvents, alcohol, (ethyl, methyl, amyl or butylic), ether, chloroform, carbon bisulfid, carbon tetra-chlorid, acetylene tetra-chlorid, acetone, benzol, camphor oil, turpentine, melted waxes, petroleum, and mineral and vegetable oils. It will not, however, form such hard infusible mass when mixed with aldehydes in general, other than those mentioned, and if the percentage of formaldehyde or its polymers exceed 7½ per cent., the excess escapes as bubbles in the mass and renders the latter useless for some purposes.

As has been stated, the phenol resin described is a hard fusible gum or resin which is soluble in many solvents, as above noted, and contains phenol and formaldehyde combined in such proportions that the phenol is almost entirely combined with the formaldehyde and there is no excess of free or uncombined formaldehyde. The phenol resin described, is, as I have stated, completely anhydrous when heated to about 400° F. at atmospheric pressure for complete dehydration. When so heated, all the water, both free and combined, is driven off from the product. The terms "anhydrous" and "dehydrated" appearing in the following claims, describe the phenol resin as containing no water, either in free or combined state. The term "fusible" appearing in the claims as qualifying my phenol resin, denotes a product which melts and becomes liquid when sufficiently heated under atmospheric pressure. The word "phenol" as employed in the claims is intended to include the equivalents of phenol for the purposes of this invention and the word "formaldehyde" is intended to include the polymers and other recognized equivalents of formaldehyde.

Having now described my invention, what I claim as new and desire to secure by Letters Patent is:—

1. The process of forming a hard fusible phenol resin, consisting in heating phenol or an equivalent in a closed chamber, forcing compressed formaldehyde gas into the liquid phenol as fast as it combines therewith, and discontinuing the operation when only a very small percentage of phenol or equivalent remains uncombined, opening the chamber and heating the contents thereof sufficiently to completely dehydrate the same, and removing the dehydrated product, substantially as described.

2. The process of forming a hard fusible phenol resin, consisting in heating phenol or an equivalent in a closed chamber to the proper temperature for reaction with formaldehyde, forcing compressed formaldehyde gas into the liquid phenol as fast as it combines therewith, carrying off the excess heat above the proper reaction temperature, and discontinuing the operation when only a very small percentage of phenol or equivalent remains uncombined, substantially as described.

3. The process of forming a hard fusible phenol resin, consisting in heating phenol or an equivalent in a closed chamber to the proper temperature for reaction with formaldehyde, forcing compressed formaldehyde gas into the liquid phenol as fast as it combines therewith, carrying off the excess heat above the proper reaction temperature, and discontinuing the operation when only a very small percentage of phenol or equivalent remains uncombined, opening the chamber for the escape of steam, and heating the contents thereof sufficiently to completely dehydrate the same, and removing the dehydrated product, substantially as described.

4. The process of forming a hard fusible phenol resin, consisting in forcing gaseous formaldehyde into liquid phenol or equivalent maintained at a temperature between 280 degrees and 340 degrees F. as fast as it combines therewith, and discontinuing the operation when only a small percentage of the phenol remains uncombined, substantially as described.

5. The process of forming a hard fusible phenol resin, consisting in causing a condensation reaction with application of heat between a phenol and formaldehyde, or equivalents, and so regulating the proportions of the reacting substances and the temperature of the reaction that in the product formed all of the formaldehyde is combined with the phenol, there is a small amount of uncombined phenol, and no portion of the product has been hardened to the infusible state, substantially as described.

6. The process of forming a hard fusible phenol resin, consisting in bringing together phenol and formaldehyde or equivalents without condensing or accelerating agents, and heating the mass under its own pressure to a temperature of from 280 to 320 degrees F., and so regulating the proportions of the reacting substances that in the product formed all of the formaldehyde is combined with the phenol and there is a small amount of uncombined phenol, substantially as described.

7. As a new article of manufacture, a hard phenol resin soluble in alcohol, fusible, melting at about 220 degrees F. without a sharp melting point, passing through various conditions of viscosity on application of heat until at 350 degrees F. it is quite thinly fluid, and weakly acid toward bases with which it combines, substantially as described.

8. As a new article of manufacture, a hard fusible liquefiable, alcohol-soluble phenol resin in which substantially all the phenol is combined with formaldehyde or equivalent, and which is substantially free from uncombined formaldehyde or equivalent and from which water cannot be evolved at temperatures below 400° F., substantially as described.

9. As a new article of manufacture, a hard phenol resin which is fusible and liquifiable, soluble in alcohol, is not changed chemically by heat below the point of its decomposition and from which water cannot be evolved at temperatures below about 400° F., substantially as described.

10. As a new article of manufacture, a hard phenol resin which is fusible and liquifiable, soluble in alcohol, and from which water cannot be evolved at temperatures below 400° F., substantially as described.

This specification signed and witnessed this 19th day of January 1912.

JONAS W. AYLSWORTH.

Witnesses:
DYER SMITH,
HENRY SHELDON.